(12) United States Patent
Terada (10) Patent No.: US 11,710,016 B1
(45) Date of Patent: Jul. 25, 2023

(54) IMAGE FORMING APPARATUS (71) Applicant: TOSHIBA TEC KABUSHIKI KAISHA, Tokyo (JP)

(72) Inventor: Takafumi Terada, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/668,406

(22) Filed: Feb. 10, 2022

(51) Int. Cl.
*G06K 15/12* (2006.01)
*G06K 15/02* (2006.01)

(52) U.S. Cl.
CPC ....... *G06K 15/1872* (2013.01); *G06K 15/129* (2013.01)

(58) Field of Classification Search
CPC .................. G06K 15/1872; G06K 15/129
See application file for complete search history.

(56) References Cited

U.S. PATENT DOCUMENTS

| | | | | |
|---|---|---|---|---|
| 2008/0159763 A1* | 7/2008 | Nakane | ............ | G03G 15/5062 399/49 |
| 2010/0103442 A1* | 4/2010 | Saiki | ............ | H04N 1/506 358/1.9 |
| 2010/0220342 A1* | 9/2010 | Takata | ............ | G06K 15/1878 358/1.9 |
| 2011/0176155 A1* | 7/2011 | Toriyabe | ............ | H04N 1/4015 358/1.9 |
| 2011/0292461 A1* | 12/2011 | Kubo | ............ | H04N 1/409 358/448 |
| 2012/0250098 A1 | 10/2012 | Ikeda | | |
| 2015/0131129 A1* | 5/2015 | Takada | ............ | H04N 1/58 358/3.26 |
| 2015/0365564 A1* | 12/2015 | Imaseki | ............ | B41J 29/393 358/504 |
| 2018/0011437 A1* | 1/2018 | Ikeda | ............ | G03G 15/50 |
| 2018/0205853 A1* | 7/2018 | Terada | ............ | H04N 1/58 |
| 2018/0234592 A1* | 8/2018 | Honda | ............ | H04N 1/6019 |
| 2021/0302886 A1* | 9/2021 | Yokote | ............ | G03G 15/5062 |

FOREIGN PATENT DOCUMENTS

| | | | | | |
|---|---|---|---|---|---|
| JP | 2006159452 A | * | 6/2006 | ......... | G03G 15/5008 |
| JP | 2007-129448 | | 5/2007 | | |
| JP | 2007129448 A | * | 5/2007 | | |
| JP | 4459039 B2 | * | 4/2010 | ......... | G03G 15/5008 |
| JP | 6756171 B2 | * | 9/2020 | ............ | G03G 15/50 |

\* cited by examiner

*Primary Examiner* — Ted W Barnes
(74) *Attorney, Agent, or Firm* — Amin, Turocy & Watson, LLP (57) ABSTRACT

An image forming apparatus includes a first generation unit to determine a density in each of a plurality of regions of a first image formed by the forming unit, and generate first correction data for correcting a density of an image to be formed by the forming unit for each of the plurality of regions based on the density. The first correction unit corrects the density of the image to be formed by the forming unit for each of the plurality of regions based on the first correction data stored by the first storage unit. The second generation unit determines a density of a second image formed by the forming unit, and generate second correction data based on the density. The first determination unit determines an amount of unevenness in the main scanning direction of formation density by the forming unit based on the density determined by the second generation unit. The second determination unit determines that the first correction data is to be generated, based on the amount of unevenness determined by the first determination unit.

20 Claims, 9 Drawing Sheets

IMAGE FORMING APPARATUS

FIELD

Embodiments described herein relate generally to an image forming apparatus and methods related thereto.

BACKGROUND

In the image forming apparatus, even if an attempt is made to form pixels having the same density value, the density of actually formed pixels may be uneven at each position along a main scanning direction. Such density unevenness is also called in-plane unevenness and contributes to deterioration of image quality.

Various techniques for correcting such density unevenness are devised. However, improvement of correction effect is required more than the techniques devised so far.

DETAILED DESCRIPTION

In general, according to one embodiment, there is provided an image forming apparatus including a forming unit, a first generation unit, a first storage unit, a first correction unit, a second generation unit, a first determination unit, and a second determination unit. The forming unit is configured to form an image. The first generation unit is configured to generate first correction data for correcting a density of an image to be formed by the forming unit for each of a plurality of regions in order to compensate for unevenness of a formation density in each of the plurality of regions by the forming unit, based on a density in each of the plurality of regions divided in a main scanning direction for a predetermined first image formed by the forming unit. The first storage unit is configured to store the first correction data generated by the first generation unit. The first correction unit is configured to correct the density of the image to be formed by the forming unit for each of the plurality of regions based on the first correction data stored by the first storage unit. The second generation unit is configured to generate second correction data for correcting the formation density by the forming unit separately from the correction by the first correction unit, based on a density of a predetermined second image formed by the forming unit. The first determination unit is configured to determine an amount of unevenness in the main scanning direction of the formation density by the forming unit based on the density determined by the second generation unit. The second determination unit is configured to determine that the first correction data is to be generated by the first generation unit, based on the amount of unevenness determined by the first determination unit.

Certain aspects of an image forming apparatus are described in U.S. patent application Ser. No. 15/641,954, filed Jul. 5, 2017 and titled "IMAGE FORMING APPARATUS THAT APPLIES CORRECTION SELECTIVELY TO A SUBSET OF PIXELS", the contents of which are all hereby incorporated by reference.

Hereinafter, an embodiment will be described with reference to the accompanying drawings. In the following embodiment, a multi-function peripheral (MFP) provided with an image forming apparatus as a printer will be described as an example.

First, a configuration of the MFP according to the embodiment will be described.

Figure 1:
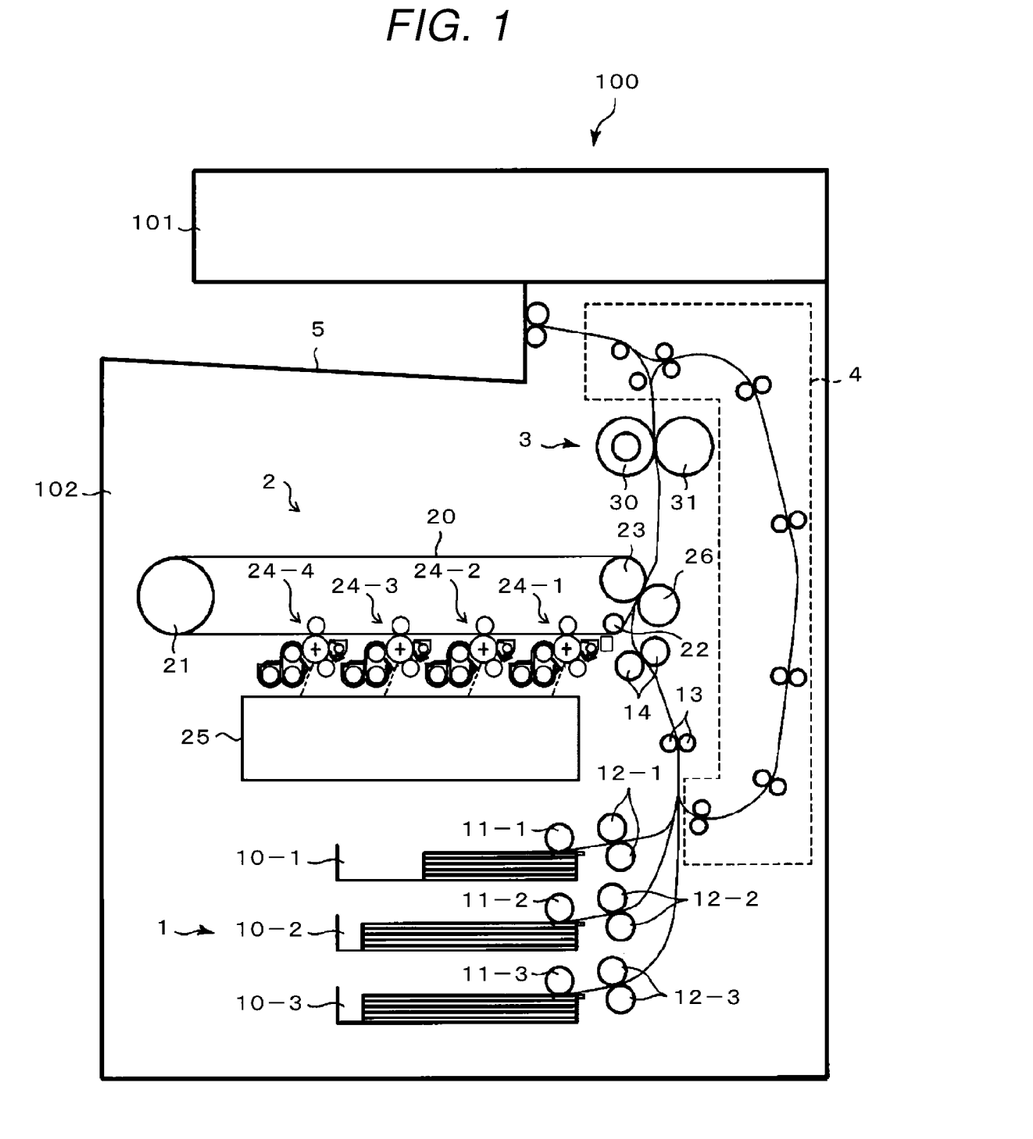
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of an original document and generates image data corresponding to the image. The scanner 101 uses an image sensor such as a charge-coupled device (CCD) line sensor to generate image data according to a reflected light image from a reading surface of the original document. The scanner 101 scans the original document placed on an original document placing stand by an image sensor that moves along the original document. The scanner 101 also scans the original document conveyed by an auto document feeder (ADF) with a fixed image sensor. The scanner 101 is an example of a reading unit.

The printer 102 forms an image on a medium, on which an image is to be formed, by an electrophotographic method. The medium is typically a print paper sheet such as cut paper. Therefore, in the following, description will be made on the assumption that the print paper sheet is used as the medium. However, as the medium, a sheet material made of paper different from the cut paper may be used, or a sheet material made of a material such as a resin other than paper may be used. The printer 102 has a color printing function for printing a color image on the print paper sheet and a monochrome printing function for printing a monochrome image on the print paper sheet. The printer 102 forms a color image by superposing element images, which are obtained by using, for example, toner having three colors of yellow, magenta, and cyan, or four colors obtained by adding black to the three colors, on each other. The printer 102 also forms a monochrome image using, for example, black toner. However, the printer 102 may have only one of the color printing function and the monochrome printing function.

In the configuration example illustrated in FIG. 1, the printer 102 includes a paper feed unit 1, a print engine 2, a fixing unit 3, an automatic double-sided unit (ADU) 4, and a paper discharge tray 5.

The paper feed unit 1 includes paper feed cassettes 10-1, 10-2, and 10-3, pickup rollers 11-1, 11-2, and 11-3, conveyance rollers 12-1, 12-2, and 12-3, a conveyance roller 13, and a registration roller 14.

The paper feed cassettes 10-1, 10-2, and 10-3 store the print paper sheets in a stacked state. The print paper sheets stored in the paper feed cassettes 10-1, 10-2, and 10-3 may be different types of print paper sheets having different sizes and materials, or may be the same type of print paper sheets. The paper feed unit 1 may also include a manual feed tray.

The pickup rollers 11-1, 11-2, and 11-3 take out the print paper sheets one by one from the paper feed cassettes 10-1, 10-2, and 10-3, respectively. The pickup rollers 11-1, 11-2, and 11-3 feed the taken out print paper sheets to the conveyance rollers 12-1, 12-2, and 12-3, respectively.

The conveyance rollers 12-1, 12-2, and 12-3 feed the print paper sheet fed from the pickup rollers 11-1, 11-2, and 11-3 respectively to the conveyance roller 13 via a conveyance path formed by a guide member (not illustrated).

The conveyance roller 13 further conveys the print paper sheet fed from any one of the conveyance rollers 12-1, 12-2, and 12-3, and feeds the print paper sheet to the registration roller 14.

The registration roller 14 corrects an inclination of the print paper sheet. The registration roller 14 adjusts the timing of feeding the print paper sheet to the print engine 2.

The paper feed cassettes, the pickup rollers, and the conveyance rollers are not limited to three sets, and any number of sets may be provided. If the manual feed tray is provided, a set of a paper feed cassette and a pickup roller and a conveyance roller paired with the paper feed cassette may not be provided.

The print engine 2 includes a belt 20, support rollers 21, 22, and 23, image forming units 24-1, 24-2, 24-3, and 24-4, an exposure unit 25, and a transfer roller 26.

The belt 20 has an endless shape and is supported by the support rollers 21, 22, and 23 so as to maintain the state illustrated in FIG. 1. The belt 20 rotates counterclockwise in FIG. 1 as the support roller 21 rotates. The belt 20 temporarily carries an image of toner to be formed on the print paper sheet on an outer surface (hereinafter referred to as an image-carrying surface). That is, the belt 20 is an example of an image carrier. For the belt 20, for example, a semiconductive polyimide is used from the viewpoint of heat resistance and abrasion resistance. The so-called sub-scanning is realized by the movement of the image-carrying surface accompanying the rotation of the belt 20, and the movement direction of the image-carrying surface is also called a sub-scanning direction.

Each of the image forming units 24-1 to 24-4 includes a photoreceptor, a charging roller, a developing device, a transfer roller, and a cleaner, and performs image forming by an electrophotographic method in cooperation with the exposure unit 25. The image forming units 24-1 to 24-4 are arranged along the belt 20 in a state where axial directions of the respective photoreceptors are parallel to each other. The image forming units 24-1 to 24-4 differ only in the color of toner used, and have the same structure and action. The image forming unit 24-1 forms an element image using, for example, black toner. The image forming unit 24-2 forms an element image using, for example, cyan toner. The image forming unit 24-3 forms an element image using, for example, magenta toner. The image forming unit 24-4 forms an element image using, for example, yellow toner. Thus, the image forming units 24-1 to 24-4 are examples of element image forming units, respectively. The image forming units 24-1 to 24-4 allow the element images of respective colors to superpose on each other on the image-carrying surface of the belt 20. With this configuration, the image forming units 24-1 to 24-4 forma color image in which each element image of each color is superposed on the image-carrying surface of the belt 20 at the time point when the belt 20 passes through the image forming unit 24-1. Although not illustrated, a developer container containing a developer containing toner of each color is disposed, for example, in information space of the belt 20. The developer may be a one-component developer consisting only of toner or a multi-component developer containing other substances such as carriers in addition to the toner.

The exposure unit 25 exposes each of the photoreceptors of the image forming units 24-1 to 24-4 according to image data representing the element images of respective colors. As the exposure unit 25, a laser scanner, a light emitting diode (LED) head, or the like is used. The exposure unit 25 includes, for example, a semiconductor laser device, a polygon mirror, an imaging lens system, and a mirror if the laser scanner is used. Then, the exposure unit 25 in this case selectively causes a laser beam emitted from a semiconductor laser element according to image data to be incident on each of the photoreceptors of the image forming units 24-1 to 24-4 by switching an emission direction by the mirror. The exposure unit 25 deflects the laser beam for scanning in an axial direction of the photoreceptor (in the depth direction in FIG. 1) by the polygon mirror. The scanning of the laser beam is so-called main scanning, and the direction thereof is called a main scanning direction.

The transfer roller 26 is disposed in parallel with the support roller 23, and sandwiches the belt 20 between the transfer roller 26 and the support roller 23. The transfer roller 26 pinches the print paper sheet fed from the registration roller 14 between the transfer roller 26 and the image-carrying surface of the belt 20. Then, the transfer roller 26 transfers the image of toner formed on the image-carrying surface of the belt 20 to the print paper sheet by utilizing electrostatic force. That is, a transfer unit is configured with the support roller 23 and the transfer roller 26. Toner may remain on the image-carrying surface of the belt 20 without being completely transferred to the print paper sheet. For that reason, toner adhering to the image-carrying surface of the belt 20 after passing through between the support roller 23 and the transfer roller 26 is removed by a cleaner (not illustrated) before the belt 20 reaches the image forming unit 24-4.

Thus, the print engine 2 forms an image on the print paper sheet fed by the registration roller 14 by the electrophotographic method. That is, the print engine 2 is an example of a forming unit.

The fixing unit 3 includes a fixing roller 30 and a pressure roller 31.

The fixing roller 30 stores a heater inside a hollow roller made of, for example, a heat-resistant resin. The heater is, for example, an induction heating (IH) heater, but any other type of heater may be used as appropriate. The fixing roller 30 fixes toner adhering to the print paper sheet sent out from the print engine 2 on the print paper sheet by melting the toner.

The pressure roller 31 is provided in parallel with the fixing roller 30 and in a state of being pressed against the fixing roller 30. The pressure roller 31 pinches the print paper sheet sent out from the print engine 2 between the pressure roller 31 and the fixing roller 30 and presses the print paper sheet against the fixing roller 30.

The ADU 4 includes a plurality of rollers and selectively performs the following two actions. The first action is to feed the print paper sheet that passes through the fixing unit 3 toward the paper discharge tray 5 as it is. This first action is performed if single-sided printing or double-sided printing is completed. In the second action, the print paper sheet that passes through the fixing unit 3 is once conveyed to the side of the paper discharge tray 5, then switched back and sent to the print engine 2. This second action is performed if image formation on only one side in double-sided printing is completed.

The paper discharge tray 5 receives the print paper sheet on which an image is formed and ejected.

Figure 2:
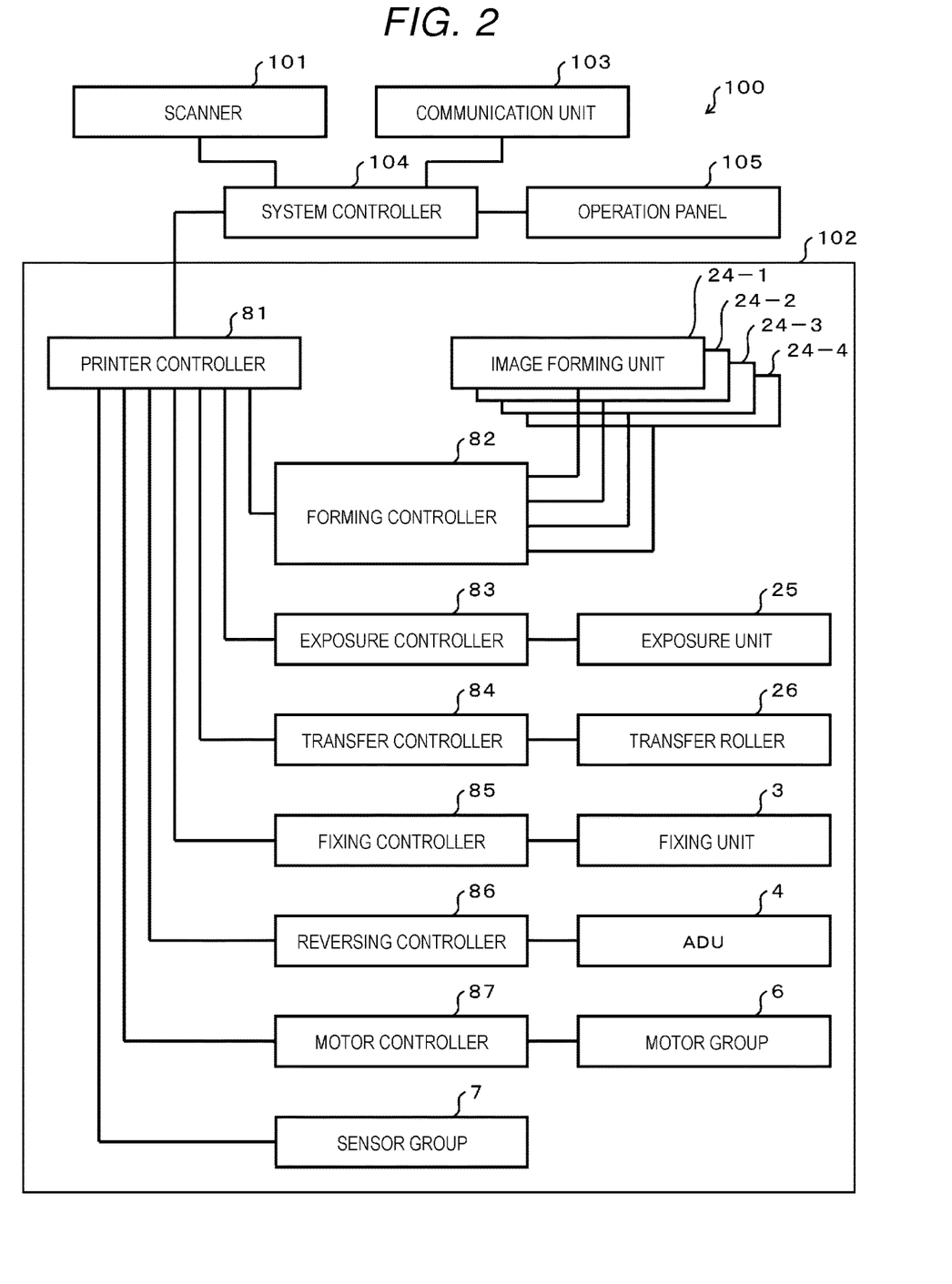
FIG. 2 is a block diagram schematically illustrating a configuration related to control of the MFP of FIG. 1.

FIG. 2 is a block diagram schematically illustrating a configuration related to the control of the MFP 100. In FIG. 2, the same elements as illustrated in FIG. 1 are denoted by the same reference numerals, and detailed description thereof will be omitted.

The MFP 100 includes a communication unit 103, a system controller 104, and an operation panel 105, in addition to the scanner 101 and the printer 102.

The communication unit 103 performs processing for communicating with an information terminal such as a computer device and an image terminal such as a facsimile device via a communication network such as a local area network (LAN) and a public communication network.

The system controller 104 comprehensively controls each part configuring the MFP 100 in order to realize a desired action as the MFP 100. The desired action of the MFP 100 is, for example, an action for realizing various functions realized by an existing MFP.

The operation panel 105 includes an input device and a display device. The operation panel 105 inputs an instruction by an operator through an input device. The operation panel 105 displays various information to be notified to the operator by the display device. As the operation panel 105, for example, a touch panel, various switches, various lamps, and the like can be used alone or in combination as appropriate.

The fixing unit 3, the ADU 4, the image forming units 24-1 to 24-4, the exposure unit 25, and the transfer roller 26 included in the printer 102 described above are elements to be controlled. In addition to these elements, the printer 102 includes a motor group 6 as an element to be controlled. The motor group 6 includes a plurality of motors for rotating various rotating bodies included in the pickup rollers 11-1, 11-2, and 11-3, the conveyance rollers 12-1, 12-2, and 12-3, the conveyance roller 13, the registration roller 14, the support roller 21, the transfer roller 26, the fixing roller 30, and the image forming unit 24-1 to 24-4, and the roller and the like included in the ADU 4.

The printer 102 further includes a sensor group 7, a printer controller 81, a forming controller 82, an exposure controller 83, a transfer controller 84, a fixing controller 85, a reversing controller 86, and a motor controller 87.

The sensor group 7 includes various sensors for monitoring an action state of the apparatus.

The printer controller 81 comprehensively controls each part configuring the printer 102 in order to realize the desired action as the printer 102 under the control of the system controller 104.

The forming controller 82, the exposure controller 83, the transfer controller 84, the fixing controller 85, the reversing controller 86, and the motor controller 87 all act under the control of the printer controller 81 and control actions of the image forming units 24-1 to 24-4, the exposure unit 25, the transfer roller 26, the ADU 4, and the motor group 6, respectively.

Figure 3:
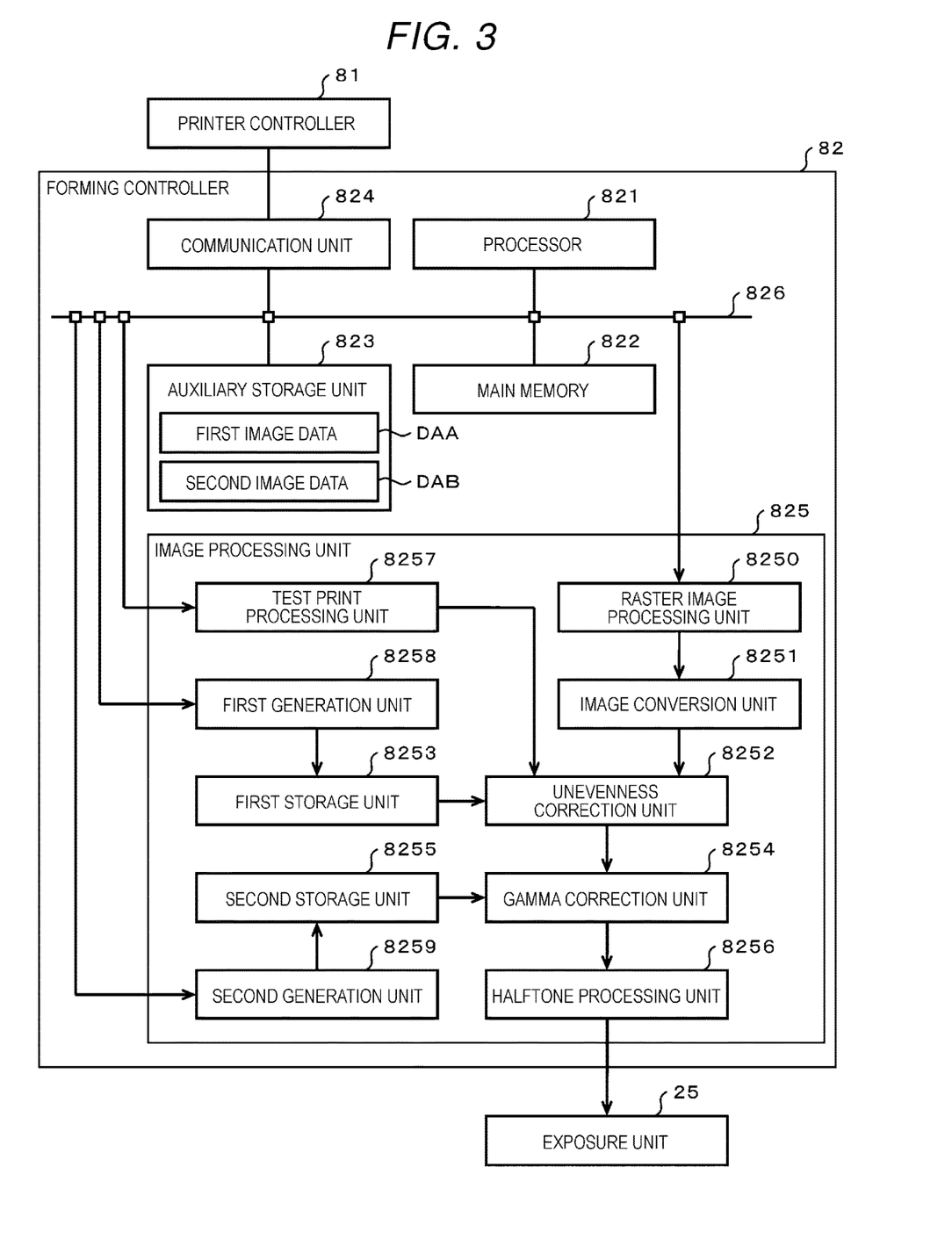
FIG. 3 is a block diagram illustrating a main circuit configuration of a forming controller in FIG. 2.

FIG. 3 is a block diagram illustrating a main circuit configuration of the forming controller 82.

The forming controller 82 includes a processor 821, a main memory 822, an auxiliary storage unit 823, a communication unit 824, an image processing unit 825, and a transmission line 826.

By connecting the processor 821, the main memory 822, and the auxiliary storage unit 823 via the transmission line 826, a computer that performs information processing for controlling the image forming units 24-1 to 24-4 is configured.

The processor 821 corresponds to a central part of the computer. The processor 821 executes information processing described later according to an information processing program such as an operating system, a middleware, and an application program.

The main memory 822 corresponds to a main memory portion of the computer. The main memory 822 includes a non-volatile memory region and a volatile memory region. The main memory 822 stores the information processing program in the non-volatile memory region. The main memory 822 may store data needed for the processor 821 to execute processing for controlling each part in the non-volatile or volatile memory region. The main memory 822 uses the volatile memory region as a work area where data is appropriately rewritten by the processor 821.

The auxiliary storage unit 823 corresponds to an auxiliary storage portion of the computer. As the auxiliary storage unit 823, for example, well-known storage devices such as an electric erasable programmable read-only memory (EE-PROM), a hard disk drive (HDD), and a solid state drive (SSD) can be used alone or by combining these components. The auxiliary storage unit 823 stores data used by the processor 821 for performing various processing and data generated in the processing by the processor 821. The auxiliary storage unit 823 stores the information processing program. The auxiliary storage unit 823 stores first image data DAA and second image data DAB as data used by the processor 821 for performing various processing. The first image data DAA and the second image data DAB will be described later.

The communication unit 824 communicates with the printer controller 81.

Four image processing units 825 respectively corresponding to the image forming units 24-1 to 24-4 are included in the forming controller 82. Each of the four image processing units 825 sets the element image formed by the corresponding image forming unit as a processing target. That is, for example, the image processing unit 825 corresponding to the image forming unit 24-1 sets a black element image as a processing target. In the following, a color of an element image targeted for processing is referred to as a target color.

Since four image processing units 825 have the same configuration, in FIG. 3, only the configuration of one image processing unit 825 is represented, and the illustration of the other three image processing units 825 is omitted.

The transmission line 826 includes an address bus, a data bus, a control signal line, and the like, and transmits data and a control signal transmitted and received between the connected parts.

The image processing unit 825 includes a raster image processing unit 8250, an image conversion unit 8251, an unevenness correction unit 8252, a first storage unit 8253, a gamma correction unit 8254, a second storage unit 8255, a halftone processing unit 8256, a test print processing unit 8257, a first generation unit 8258, and a second generation unit 8259.

The raster image processing unit 8250 converts image data given as a print target into element image data representing an element image of the target color in raster format. Specific processing executed by the raster image processing unit 8250 may be, for example, the same processing as that performed by an existing apparatus of the same type.

The image conversion unit 8251 performs conversion processing such as color conversion processing and filter processing on the element image data obtained by the raster image processing unit 8250. Specific processing executed by the image conversion unit 8251 may be, for example, the same processing as that performed by an existing apparatus of the same type.

The unevenness correction unit 8252 performs in-plane correction, which is correction processing of element image data for compensating for in-plane unevenness, with reference to a first correction table stored in the first storage unit 8253. The correction processing by the unevenness correction unit 8252 will be described later. The unevenness correction unit 8252 corresponds to a first correction unit.

The first storage unit 8253 stores the first correction table, which is a correction table for in-plane unevenness correction. The first correction table will be described later.

The gamma correction unit 8254 performs gamma correction, which is correction processing of element image data for adjusting a gradation characteristic, with reference to a second correction table stored in the second storage unit 8255.

The second storage unit 8255 stores the second correction table, which is a correction table for gamma correction. The second correction table will be described later. The gamma correction unit 8254 corresponds to a second correction unit.

The element image data corrected by the unevenness correction unit 8252 is given to the halftone processing unit 8256. This element image data remains in raster format. The halftone processing unit 8256 converts image data output from the unevenness correction unit 8252 into element image data in a pseudo halftone format using, for example, an error diffusion method, a dither method, or a density pattern method. Specific processing executed by the halftone processing unit 8256 may be, for example, the same processing as that performed by an existing apparatus of the same type.

The test print processing unit 8257 performs processing for printing the first test image and the second test image under the instruction of the processor 821.

The first generation unit 8258 generates the first correction table based on image data obtained by scanning the first test image with the scanner 101, and updates the first correction table stored in the first storage unit 8253.

The second table generation unit 8239 generates the second correction table based on image data obtained by scanning the second test image with the scanner 101, and updates the second correction table stored in the second storage unit 8255.

Next, an action of the MFP 100 configured as described above will be described. The contents of various actions and various processing described below are examples, and changes in the order of some actions and processing, omission of some actions and processing, addition of other actions and processing, and the like can be made appropriately.

In the following, an operation different from that of the existing MFP of the same type will be mainly described, and the description of other actions will be omitted. The characteristic action of the MFP 100 in this embodiment is an action of the forming controller 82.

If an image is to be printed by the printer 102, if image data targeted for printing represents a color image, the processor 821 gives the image data to each of the four image processing units 825. That is, color image data is input to each of the four raster image processing units 8250. Each of the four raster image processing units 8250 generates element image data representing an element image of each of the colors of black, cyan, magenta, and yellow in raster format from the given image data.

The element image data of each color is processed by each of the four image processing units 825, but in the following, processing related to element image data of one color will be described below.

The image conversion unit 8251 performs conversion processing such as color conversion processing and filter processing on the element image data generated by the raster image processing unit 8250. A part of the color conversion processing is processing that takes into consideration a property of the target color.

The first correction table stored by the first storage unit 8253 is a data table in which an output value is correlated with each of a plurality of input values. The plurality of input values are gradation values that can be represented by the element image data generated by the raster image processing unit 8250. That is, if gradation values of 0 to 255 are used in the element image data generated by the raster image processing unit 8250, the input values of the first correction table are values of 0 to 255, respectively. The output value represents the gradation value after correction from the gradation value represented by the element image data generated by the raster image processing unit 8250. The input value and the output value may be the same. In the first correction table, a correlation between the input value and the output value is represented for each of a plurality of regions set by dividing a print width in the main scanning direction in the image forming units 24-1 to 24-4. That is, in the first correction table, a plurality of output values for each of the plurality of regions are correlated with one input value. In this embodiment, the print width in the main scanning direction is divided into four equal parts, and four regions of the region RA, the region RB, the region RC, and the region RD are set.

The unevenness correction unit 8252 replaces each of the gradation values represented by the element image data output from the raster image processing unit 8250 with an output value correlated with the same input value in the first correction table for a region to which a pixel position, to which the gradation value is applied, belongs. With this configuration, the gradation value represented by the element image data is adjusted for each region to correct in-plane unevenness.

The gamma correction unit 8254 performs gamma correction on the element image data after unevenness correction based on the second correction table stored in the second storage unit 8255. Correction processing to be performed as gamma correction may be freely selected, for example, the same processing as that performed by an existing apparatus of the same type may be used. The second correction table may also be, for example, a well-known data table based on the correction processing executed by the gamma correction unit 8254.

The element image data after gamma correction is converted into element image data in a pseudo halftone format by the halftone processing unit 8256, and then supplied to the exposure unit 25 for exposure of the target color.

With the configuration described above, correction of in-plane unevenness is carried out by adjusting an exposure amount in the exposure unit 25 in each of the region RA to the region RD. However, for example, due to the difference in the degree of partial deterioration of a photosensitive drum and the like, an occurrence state of in-plane unevenness during image formation in the image forming units 24-1 to 24-4 gradually changes, and eventually the first correction table stored in the first storage unit 8253 may not be appropriate for correcting in-plane unevenness. In this case, in-plane unevenness cannot be sufficiently corrected by correction processing in the unevenness correction unit 8252, and in-plane unevenness of a printed image becomes conspicuous.

A maintenance worker such as a user or a serviceman who notices an increase in in-plane unevenness from the printed image instructs adjustment of in-plane unevenness correction through, for example, a predetermined operation on the operation panel 105. In response to this instruction, the printer controller 81 instructs the forming controller 82 to start adjusting unevenness correction. In response to this instruction, the processor 821 in the forming controller 82 starts information processing (hereinafter referred to as a first adjustment process) described below according to the information processing program stored in the main memory 822 or the auxiliary storage unit 823.

Figure 4:
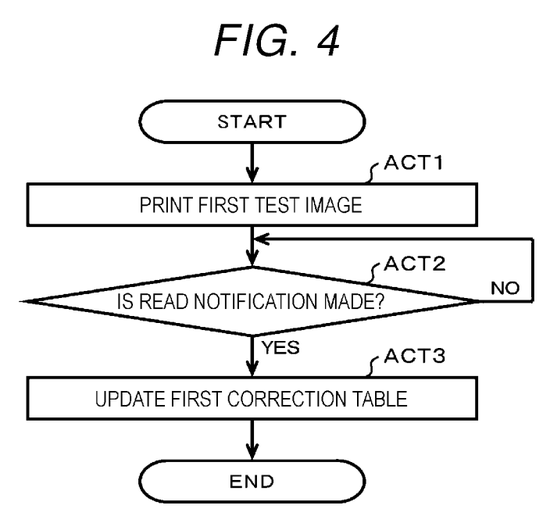
FIG. 4 is a flowchart of a first adjustment process.

FIG. 4 is a flowchart of a first adjustment process.

As ACT 1, the processor 821 prints a first test image. For example, the processor 821 starts the action of the image forming units 24-1 to 24-4, reads out the first image data DAA stored in the auxiliary storage unit 823, and sends the first image data DAA to the test print processing unit 8257.

Figure 5:
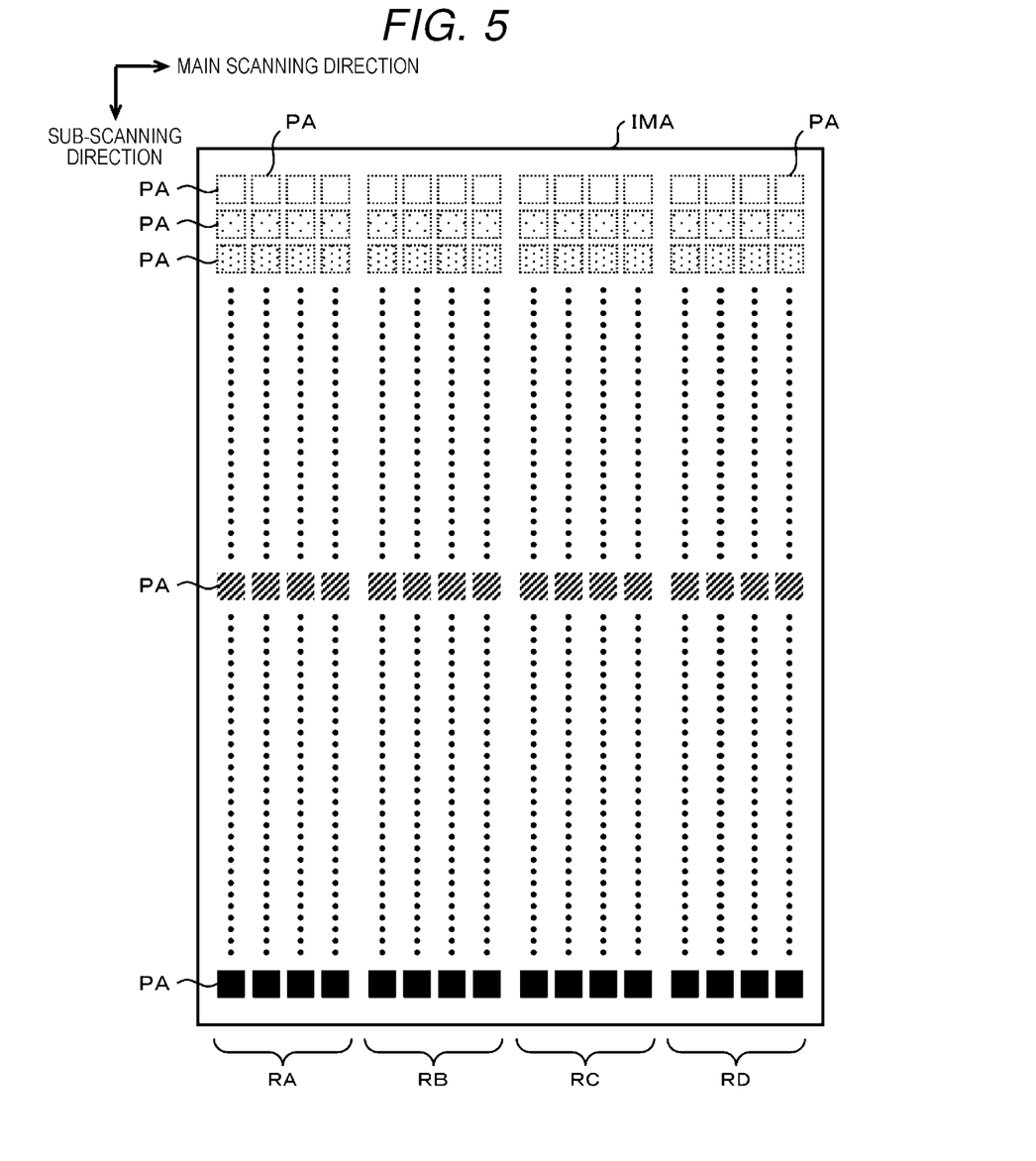
FIG. 5 is a diagram illustrating a first test image represented by first image data.

FIG. 5 is a diagram illustrating a first test image IMA represented by the first image data.

The first test image IMA is an image illustrating a large number of patches PAs arranged in the main scanning direction and the sub-scanning direction. However, in FIG. 5, only some patches PAs are illustrated, and the illustration of many other patches PAs is omitted. FIG. 5 mainly illustrates the state of an arrangement of respective patches PAs, and the illustrated patches PAs do not faithfully represent actual patches.

The first test image IMA includes four patches PAs aligned in the main scanning direction in each of the region RA to the region RD. The colors of these four patches PAs are yellow, magenta, cyan and black, respectively. All patches PAs aligned in the main scanning direction have the same gradation value. That is, four of the plurality of patch PAs aligned in the main scanning direction, which are located in different regions, all have the same color and the same gradation value.

The plurality of patches PAs aligned in the sub-scanning direction are all the same color. The plurality of patch PAs aligned in the sub-scanning direction have different gradation values. The gradation value of the patch PA illustrated at the top in FIG. 5 is the minimum, and the gradation value gradually increases toward the bottom in FIG. 5. In the following, a plurality of patches PAs aligned in the sub-scanning direction will be referred to as a patch line. In the first test image IMA, a plurality of patch lines are aligned side by side along the main scanning direction. The degree of change in the gradation value of each patch PA in one patch line is the same for each patch line.

Thus, each of the region RA to the region RD includes the patch lines of respective colors, and a formation state of each patch PA is the same.

The test print processing unit 8257 generates element image data related to the element image of the target color in the first test image IMA from the first image data, and gives the element image data to the unevenness correction unit 8252. The element image data is supplied to the exposure unit 25 after being subjected to processing by the unevenness correction unit 8252, the gamma correction unit 8254, and the halftone processing unit 8256. Then, by the well-known forming action by the image forming units 24-1 to 24-4 and the exposure unit 25, on the image-carrying surface of the belt 20, a black patch PA is formed by the image forming unit 24-1, a cyan patch PA is formed by the image forming unit 24-2, a magenta patch PA is formed by the image forming unit 24-3, and a yellow patch PA is formed by the image forming unit 24-4, respectively. The print paper sheet, onto which the first test image formed on the image-carrying surface of the belt 20 is transferred and fixed by the transfer roller 26 and the fixing unit 3, is ejected to the paper discharge tray 5.

In the first test image printed on the print paper sheet in this way, due to the influence of in-plane unevenness, a difference in density occurs in each of the region RA to the region RDs even between the patch PAs aligned side by side in the main scanning direction. That is, although the disposition of the patches PAs is the same between the image represented by the first image data and the image actually printed, the relationship between densities of the patches PAs is different.

The maintenance worker sets the print paper sheet on which the first test image is printed and ejected to the paper discharge tray 5 in the scanner 101, and instructs the scanner to read the printed paper sheet through, for example, a predetermined operation on the operation panel 105. If the scanner 101 reads the first test image in response to this instruction, the system controller 104 notifies the forming controller 82 that the first test image is read. Subsequently, the system controller 104 sends image data (hereinafter referred to as first read data) generated by the scanner 101 to the forming controller 82.

If the processor 821 finishes instructing printing of the first test image in ACT 1 in FIG. 4, the processor 821 proceeds to ACT 2.

As ACT 2, the processor 821 waits for read notification. Then, if the read is notified from the system controller 104 as described above, the processor 821 determines YES, and proceeds to ACT 3.

As ACT 3, the processor 821 updates the first correction table. For example, the processor 821 instructs the first generation unit 8258 to start updating, and then sends the first read data sent from the system controller 104 to the first generation unit 8258.

If the update start is instructed and the first read data is sent from the processor 821, the first generation unit 8258 analyzes the first read data and obtains a relationship between a density value (hereinafter referred to as an original density value) of each patch PA represented by the first image data and a density value (hereinafter referred to as a read value) of each patch PA represented by the first read data for each region for the target color.

The first generation unit 8258, for example, obtains a linear approximation formula for scatter data obtained by plotting the density value represented by the first read data for each of the plurality of patches PAs included in one patch line in the coordinate system where the position in the first test image along the sub-scanning direction is defined as the horizontal axis and the density value represented by the first read data is defined as the vertical axis. Then, the first generation unit 8258, for example, obtains such a linear approximation formula for each of the four patch lines of the target color.

Figure 6:
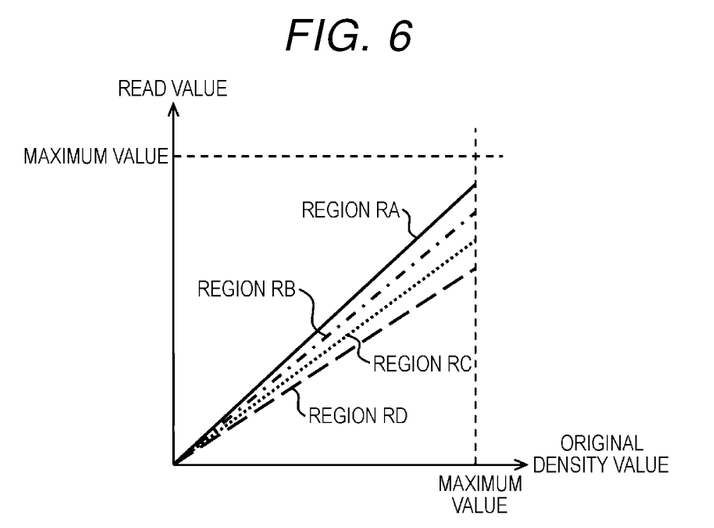
FIG. 6 is a diagram illustrating approximate straight lines represented by linear approximation formulas obtained for each of four regions of a region RA to a region RD for one color.

FIG. 6 is a diagram illustrating approximate straight lines represented by linear approximation formulas obtained for each of the region RA to the region RD for one color.

Since the gradation value of each patch PA in the patch line in the first test image IMA gradually changes in the sub-scanning direction, the position in the first test image along the sub-scanning direction corresponds to the original density value. Therefore, in FIG. 6, the horizontal axis is the original density value.

FIG. 6 illustrates an example in which the density of the patch in the first test image actually printed in each region is lower than the original density value, but a rate of decrease of the density increases toward the region RD.

The first generation unit 8258 uses, for example, a region where the rate of decrease of a read density value with respect to the original density value is the largest, that is, a region where the slope of the linear approximation formula is the smallest as a reference region. For example, the first generation unit 8258 generates the first correction table so as to represent the input value and the same output value as the input value in correlation with each other for the reference region and represent the input value and the output value smaller than this input value in correlation with each other for the other regions. The first generation unit 8258 determines, for example, the output value for a region other than the reference region to compensate for the difference between a rate of decrease of the density in that region and the rate of decrease of the density in the reference region. The first generation unit 8258 generates, for example, the first correction table as a data table in which the output value determined for each region is correlated with the input value. Then, the first generation unit 8258 rewrites the first correction table stored in the first storage unit 8253 with the first correction table generated in this way. Here, the first correction table is an example of first correction data.

Figure 7:
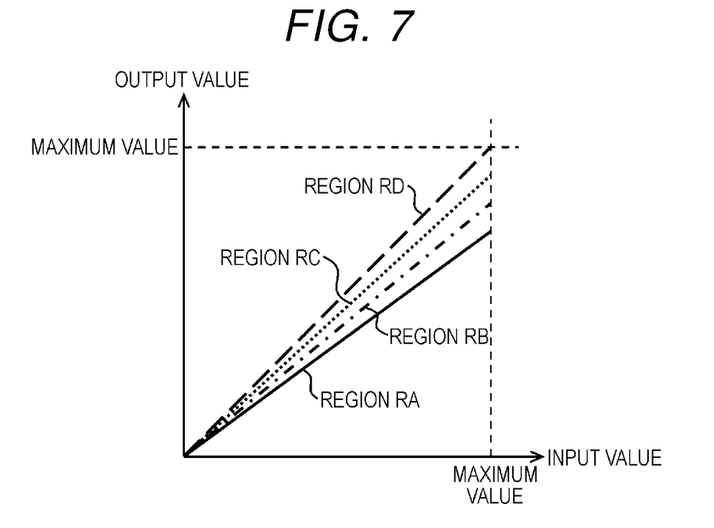
FIG. 7 is a diagram illustrating a relationship between an input value and an output value represented in a first correction table for one color.

FIG. 7 is a diagram illustrating the relationship between the input value and the output value represented in the first correction table for one color.

FIG. 7 relates to the first correction table generated in response to the acquisition of the linear approximation formula representing the approximate straight line of FIG. 6.

If the first generation unit 8258 updates the first correction table as described above, the processor 821 ends the first adjustment process.

By the way, the gradation characteristics during image formation in the image forming units 24-1 to 24-4 may change due to factors such as progression of deterioration. As a result, gamma correction by the gamma correction unit 8254 based on the second correction table stored by the second storage unit 8255 may not maintain the gradation characteristics of the formed image properly.

The maintenance worker who notices an abnormality in the gradation characteristics from the printed image instructs the adjustment of gamma correction through, for example, a predetermined operation on the operation panel 105. In response to this instruction, the printer controller 81 instructs the forming controller 82 to start adjusting gamma correction. In response to this instruction, the processor 821 in the forming controller 82 starts information processing (hereinafter referred to as a second adjustment process) described below according to the information processing program stored in the main memory 822 or the auxiliary storage unit 823.

Figure 8:
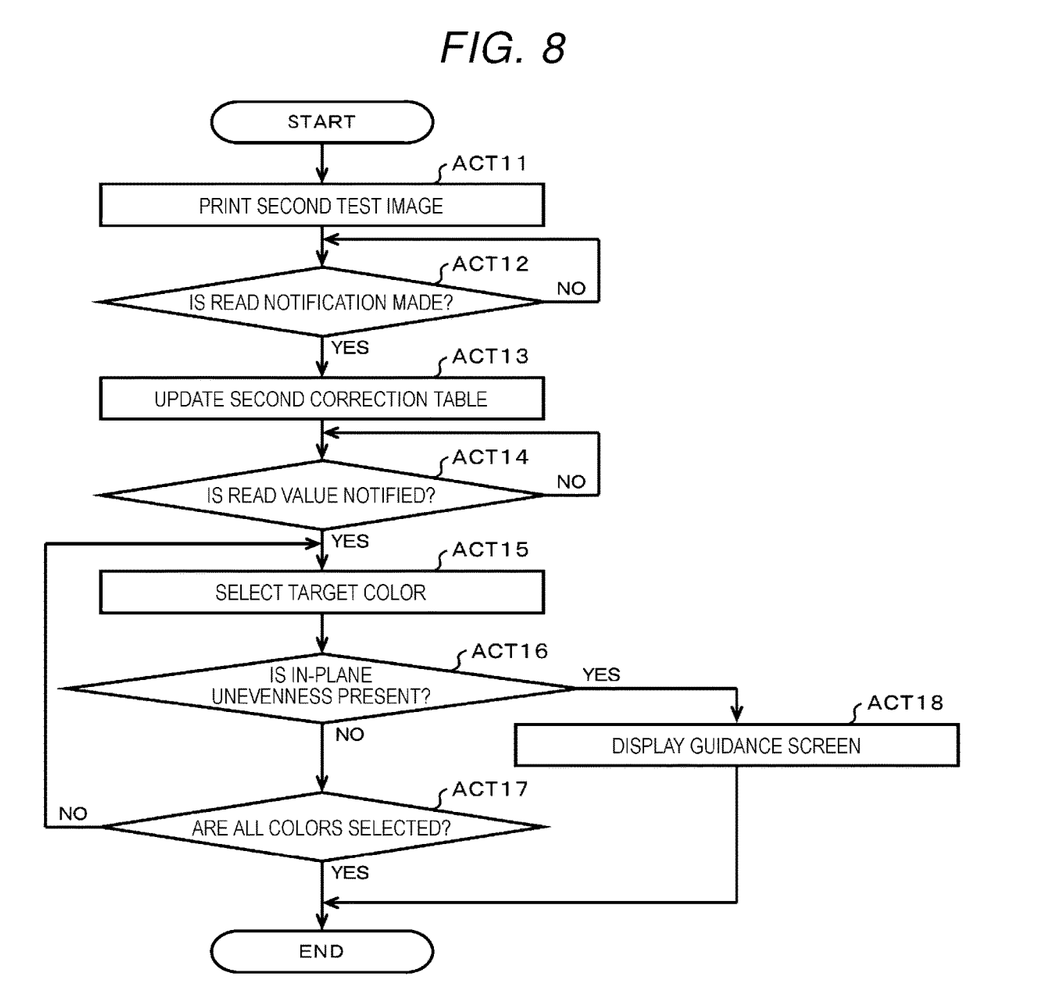
FIG. 8 is a flowchart of a second adjustment process.

FIG. 8 is a flowchart of the second adjustment process.

As ACT 11, the processor 821 prints a second test image. For example, the processor 821 starts the action of the image forming units 24-1 to 24-4, reads out the second image data DAB stored in the auxiliary storage unit 823, and sends the second image data DAB to the test print processing unit 8257.

Figure 9:
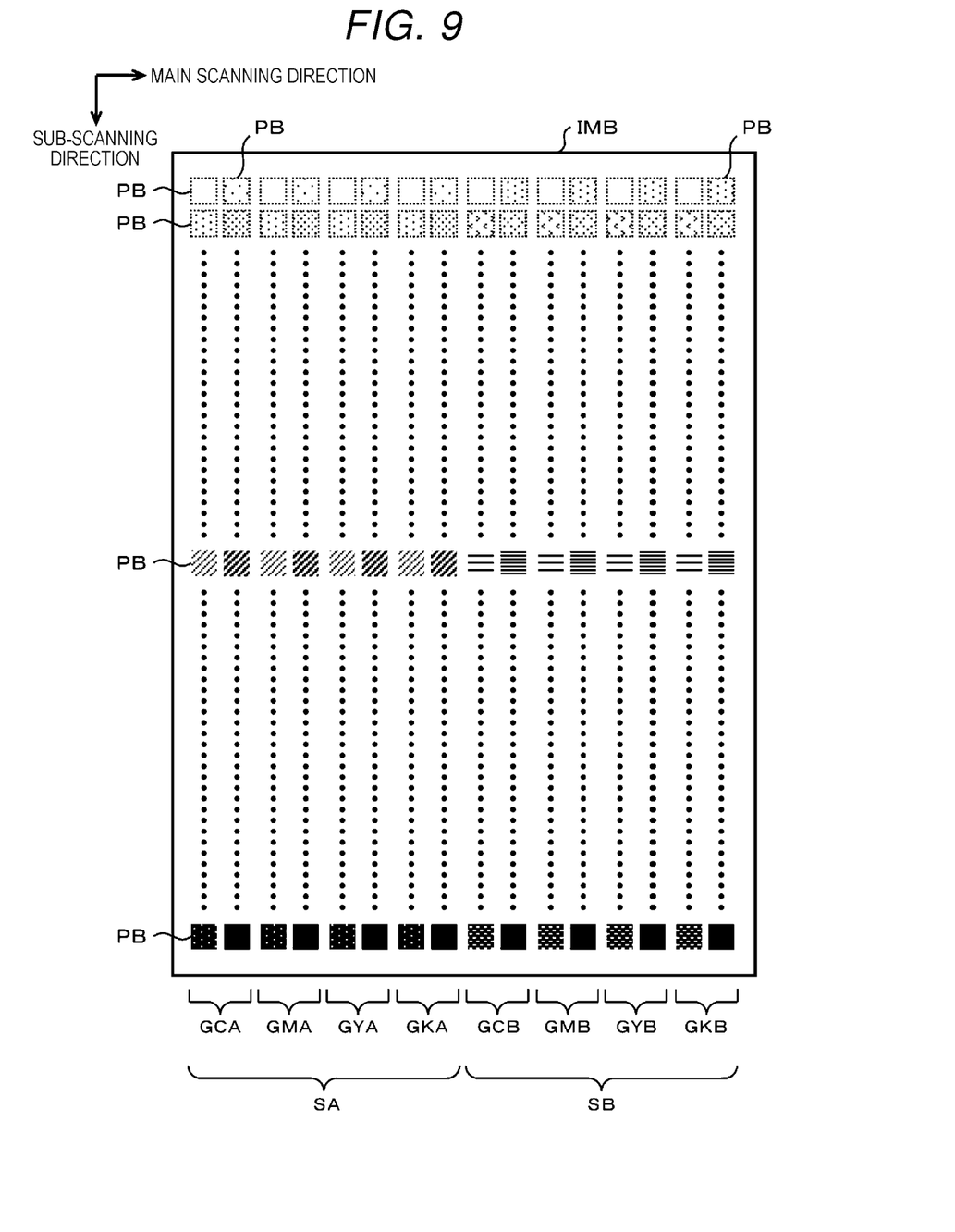
FIG. 9 is a diagram illustrating a second test image represented by second image data.

FIG. 9 is a diagram illustrating a second test image IMB represented by the second image data.

The second test image IMB is an image illustrating a large number of patches PBs arranged in the main scanning direction and the sub-scanning direction. However, in FIG. 9, only some patches PBs are illustrated, and the illustration of many other patches PBs is omitted. FIG. 9 mainly illustrates the state of the arrangement of respective patches PBs, and the illustrated patches PB do not faithfully represent actual patches.

The second test image IMB includes two screens SA and SB aligned side by side in the main scanning direction.

The screen SA includes patch groups GCA, GMA, GYA, and GKA, and the screen SB includes patch groups GCB, GMB, GYB, and GKB. The patch groups GCA, GMA, GYA, GKA, GCB, GMB, GYB, and GKB all include a large number of patches PBs. The color of the patches PBs included in the patch groups GCA and GCB is cyan, the color of the patches PBs included in the patch groups GMA and GMB is magenta, the color of the patches PBs included in the patch groups GYA and GYB is yellow, and the color of the patches PBs included in the patch groups GKA and GKB is black. Many patches included in one patch group have different gradation values. The gradation of each patch PB is expressed by a pseudo halftone. In one patch group, the gradation value of the patch PB located on the left side of the uppermost row in FIG. 9 is "0", and the gradation value of the patch PB located on the right side of the lowermost row is the maximum value. The maximum value is, for example, "255". The difference in gradation value between the patches PBs adjacent to each other in the main scanning direction in one patch group, or the difference in gradation value between the patch PB located on the right side in FIG. 9 and the patch PB located on the left side of the row one row below that patch in one patch group is a value obtained by dividing a value, which is obtained by adding "1" to the maximum value of the gradation value, by the number of patch PBs included in one patch group. That is, the gradation value of each patch PB included in one patch group increases uniformly in the order of the left side of a certain row in FIG. 9, the right side of the same row, and the left side of the row one row below that patch.

However, an arrangement order of the patches PBs is not limited to the arrangement order described above. For example, the gradation value of each patch PB included in one patch group gradually decreases in the order of the left side of a certain row in FIG. 9, the right side of the same row, and the left side of the row one row below that patch. For example, the gradation value of each patch PB included in one patch group gradually increases or decreases in the order of the left side of a certain row in FIG. 9, the right side of the same row, and the left side of the row one row below that patch, but the gradation difference does not have to be uniform. Alternatively, for example, the gradation value of each patch PB included in one patch group may change irregularly in the order of the left side of a certain row in FIG. 9, the right side of the same row, and the left side of the row one row below that patch. An image to be selected as the second test image may be appropriately determined by, for example, a designer of the MFP 100.

In the patch group GCA and the patch group GCB, the relationships between the colors and the gradation values of the included patches PB are congruent. However, the patterns that form the patches PB are different between the patch group GCA and the patch group GCB. This is the same for the patch group GMA and patch group GMB, the patch group GYA and patch group GYB, and the patch group GKA and patch group GKB, respectively. The respective patches PBs included in the screen SA have a pattern that is suitable for, for example, a photographic region. The respective patches PBs included in the screen SB have a pattern suitable for, for example, a character region.

However, the fact that the relationships between the colors and the gradation values of the patches PBs included in the respective patch groups are to be congruent is not indispensable, and the relationships may be individually determined for each patch group. However, the patch PB of the gradation value used for checking an occurrence status of in-plane unevenness, which will be described later, is included in both of two patch groups of the same color.

The test print processing unit 8257 generates element image data related to the element image of the target color in the second test image IMB from the second image data, and gives the element image data to the unevenness correction unit 8252. The element image data is supplied to the exposure unit 25 after being subjected to processing by the unevenness correction unit 8252, the gamma correction unit 8254, and the halftone processing unit 8256. Then, by the well-known forming action by the image forming units 24-1 to 24-4 and the exposure unit 25, on the image-carrying surface of the belt 20, a black patch PB is formed by the image forming unit 24-1, a cyan patch PB is formed by the image forming unit 24-2, a magenta patch PB is formed by the image forming unit 24-3, and a yellow patch PA is formed by the image forming unit 24-4, respectively. The print paper sheet, onto which the second test image formed on the image-carrying surface of the belt 20 is transferred and fixed by the transfer roller 26 and the fixing unit 3, is ejected to the paper discharge tray 5.

The maintenance worker sets the print paper sheet on which the second test image is printed and ejected into the paper discharge tray 5 in the scanner 101, and instructs the scanner to read the printed paper sheet through, for example, a predetermined operation on the operation panel 105. If the scanner 101 reads the second test image in response to this instruction, the system controller 104 notifies the forming controller 82 that the second test image is read. Subsequently, the system controller 104 sends image data (hereinafter referred to as second read data) generated by the scanner 101 to the forming controller 82.

If the processor 821 finishes instructing printing of the second test image in ACT 11 in FIG. 8, the processor 821 proceeds to ACT 12.

As ACT 12, the processor 821 waits for read notification. Then, if the read is notified from the system controller 104 as described above, the processor 821 determines YES, and proceeds to ACT 13.

As ACT 13, the processor 821 updates the second correction table. For example, the processor 821 instructs the second generation unit 8259 to start updating, and then sends the second read data sent from the system controller 104 to the second generation unit 8259.

If the update start is instructed and the second read data is sent from the processor 821, the second generation unit 8259 determines the gradation values of the respective patches PBs in the second read data, and generates a second correction table based on the gradation values. As specific processing of the second generation unit 8259 here, for example, well-known processing for generating a correction table for gamma correction can be used as it is. Then, the second generation unit 8259 rewrites the second correction table stored in the second storage unit 8255 with the second correction table generated in this way. The second generation unit 8259 notifies the processor 821 of the determined gradation value of each patch PB as a read value.

If the processor 821 instructs the second generation unit 8259 to start updating, the processor 821 proceeds to ACT 14.

As ACT 14, the processor 821 waits for the read value to be notified. Then, if the read value is notified from the second generation unit 8259 as described above, the processor 821 determines YES, and proceeds to ACT 15.

As ACT 15, the processor 821 selects one of the colors corresponding to the image forming units 24-1 to 24-4 as the target color.

As ACT 16, the processor 821 checks whether or not in-plane unevenness is present for the target color. For example, the processor 821 obtains an absolute value of a difference between the read values of two patches PBs included in each of the screen SA and the screen SB, as gradation values predetermined in the second image data, for the target color. For example, if the read values for two patches PBs included in each of the screens SA and SB for the gradation value "255" are "252" and "247", the processor 821 obtains "5" as an absolute value of the difference. Then, if the absolute value of the difference is small enough to say that in-plane unevenness is not present, the processor 821 determines that in-plane unevenness is not present. For example, if the absolute value of the difference is less than a predetermined threshold value, the processor 821 determines that the difference is small enough to say that in-plane unevenness is not present, and determines NO in ACT 16. Assuming that the threshold value is "10", the processor 821 determines NO if the absolute value of the difference is "5" as described above. The threshold value may be appropriately set by, for example, the designer of the MFP 100. Then, if it is determined that determination result in ACT 16 is NO, the processor 821 proceeds to ACT 17. In order to obtain the absolute value of the difference, a design that uses a gradation value other than the gradation value "255" may also be considered. In order to obtain the absolute value of the difference, a design that uses different gradation values for each color may also be considered.

As ACT 17, the processor 821 repeats ACT 15 to check whether or not all of the corresponding colors of the image forming units 24-1 to 24-4 are selected as the target colors. Then, if all of the corresponding colors are not selected, the processor 821 determines NO, and repeats ACT 15 and subsequent actions in the same manner as described above. In this case, in ACT 15, the processor 821 selects a color that is not yet selected as the target color while repeating ACT 15 in this way.

For example, if the read values for two patches PBs included in the screens SA and SB for the gradation value "255" are "250" and "238", respectively, the processor 821 obtains "12" as the absolute value of the difference. Then, in this case, since the absolute value of the difference is equal to or greater than the threshold value, the processor 821 determines that in-plane unevenness is present, determines YES in ACT 16, and proceeds to ACT 18.

As ACT 18, the processor 821 displays a predetermined guidance screen as a screen for recommending execution of an in-plane unevenness correction adjustment process.

That is, the processor 821 determines an amount of unevenness as the absolute value of the difference, and determines that the first correction data is to be generated based on the amount of unevenness. Thus, by executing information processing by the processor 821 based on the information processing program, the computer having the processor 821 as the central part functions as a first determination unit and a second determination unit.

Figure 10:
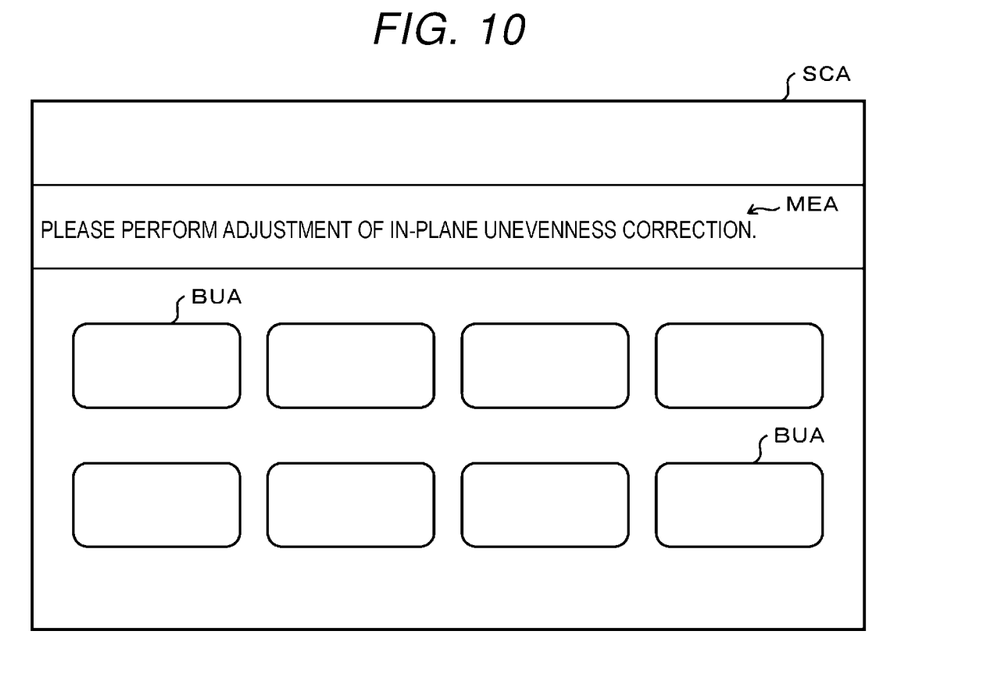
FIG. 10 is a diagram illustrating an example of a guidance screen.

FIG. 10 is a diagram illustrating an example of a guidance screen SCA.

The guidance screen SCA is a screen illustrating a character message MEA for recommending the execution of the in-plane unevenness correction adjustment process in a partial region of an operation screen for the operation related to the MFP 100.

For example, it is assumed that the MFP 100 has the specifications for displaying a maintenance operation screen on the operation panel 105 for receiving an operation for instructing the maintenance worker to adjust gamma correction even after the adjustment of gamma correction is completed. In this case, the processor 821 requests the system controller 104 to display the character message MEA via the printer controller 81, as ACT 18. In response to this request, the system controller 104 causes the guidance screen SCA to be displayed on the operation panel 105. In this case, a plurality of button BUAs illustrated in FIG. 10 are soft keys to which various functions related to maintenance such as instructing adjustment of gamma correction are assigned. If one of these button BUAs indicates the adjustment of in-plane unevenness correction, the maintenance worker can quickly and easily adjust in-plane unevenness correction according to the recommendation in the character message MEA.

However, the operation screen that is the base of the guidance screen SCA may be another screen such as a so-called home screen. Alternatively, the guidance screen may be a dedicated screen for recommending the execution of the in-plane unevenness correction adjustment process. For example, the designer of the MFP 100 may freely determine a screen to be selected as the guidance screen.

In this way, the function as a notification unit is realized by the cooperation of the processor 821, the system controller 104, and the operation panel 105.

After that, the processor 821 ends the second adjustment process. The display of the guidance screen may be displayed by, for example, the system controller 104 in response to the end of a predetermined display period. The display period is, for example, a period that ends at the time point when the elapsed time from displaying the guidance screen reaches a predetermined time. The display period is, for example, a period that ends at the time point when another screen needs to be displayed. The display period is, for example, a period that ends at the time point when the operator issues an instruction to end the display. A period to be selected as the display period may be freely determined by, for example, the designer of the MFP 100.

By the way, if in-plane unevenness does not occur in any of the colors, the processor 821 proceeds to ACT 17 in FIG. 8 in a state where all the corresponding colors of the image forming units 24-1 to 24-4 are selected as the target colors. Then, in this case, the processor 821 determines YES in ACT 17 and ends the second adjustment process without executing ACT 18.

As described above, if the second read data is obtained to update the second correction table for gamma correction, the MFP 100 determines the necessity of executing the first adjustment process on the basis of the occurrence status of in-plane unevenness based on the read value represented by the second read data. Accordingly, by referring to the result of this determination, the maintenance worker can easily recognize the necessity of executing the first adjustment process. Then, by instructing the execution of the first adjustment process by the maintenance worker based on the recognition, the first correction table is kept in an appropriate state, and in-plane unevenness correction can be effectively performed. That is, if the first correction table is left in an inappropriate state to correct in-plane unevenness, in-plane unevenness correction may not function sufficiently and image quality may deteriorate. However, in the MFP 100, by updating the first correction data diligently, the ratio of the period during which appropriate correction can be performed can be increased, and the correction effect can be improved.

The MFP 100 displays a guidance screen for recommending the execution of the first adjustment process in response to the determination that the execution of the first adjustment process is needed. Therefore, the maintenance worker can be made to promptly recognize the necessity of executing the first adjustment process.

This embodiment can be modified in various ways as follows.

Reading of the first test image and the second test image may be performed by any reading device external to the MFP 100.

A notification action for recommending the execution of the in-plane unevenness correction adjustment process is not limited to the screen display on the operation panel 105, and may be performed, for example, by transmitting a message to an external information terminal or printing on the printer 102. In the case of printing of the message, if a checking image that facilitates checking the occurrence status of in-plane unevenness, in addition to a text message, is included in an image to be printed, the maintenance person can easily check whether or not the adjustment process for in-plane unevenness correction is to be executed.

The notification action for recommending the execution of the in-plane unevenness correction adjustment process may not be automatically executed. For example, if the processor 821 determines YES in ACT 16, the processor 821 sets a flag indicating the necessity of the in-plane unevenness correction adjustment process. Then, the processor 821 or the system controller 104 outputs information indicating the necessity of the in-plane unevenness correction adjustment process by any method such as display, transmission, or printing, depending on a status of the flag, according to a predetermined operation for inquiring about the necessity of the in-plane unevenness correction adjustment process.

The second generation unit 8259 may notify the processor 821 of only the read value of the patch PB related to the gradation value used for determination of whether or not in-plane unevenness is present, by the processor 821, among the determined read values of the patches PBs. The difference between the read values of two patches PBs or the absolute value thereof may be calculated by the second generation unit 8259, and the calculation result may be notified from the second generation unit 8259 to the processor 821.

As long as a device that forms an image by an electrophotographic method is used, the same implementation as described above can be performed in various apparatuses other than the MFP such as a copier, a printer, and a facsimile machine.

The number of image forming units is not limited to four, and it is sufficient to include at least one image forming unit.

Each function realized by the processor 821 by information processing in the embodiment described above can also be realized partially or entirely by hardware, such as a logic circuit or the like, that executes information processing that is not based on a program. Each of the functions described above can be realized by combining software control with hardware described above such as a logic circuit.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a forming unit configured to form an image;
a first generation unit configured to generate first correction data for correcting a density of an image to be formed by the forming unit for each of a plurality of regions in order to compensate for unevenness of a formation density in each of the plurality of regions by the forming unit, based on a density in each of the plurality of regions divided in a main scanning direction for a predetermined first image formed by the forming unit;
a first storage unit configured to store the first correction data generated by the first generation unit;
a first correction unit configured to correct the density of the image to be formed by the forming unit for each of the plurality of regions based on the first correction data stored by the first storage unit;
a second generation unit configured to generate second correction data for correcting the formation density by the forming unit separately from the correction by the first correction unit, based on a density of a predetermined second image formed by the forming unit;
a first determination unit configured to determine an amount of unevenness in the main scanning direction of the formation density by the forming unit based on the density of the predetermined second image formed by the forming unit; and
a second determination unit configured to determine that the first correction data is to be generated by the first generation unit, based on the amount of unevenness determined by the first determination unit.

2. The image forming apparatus according to claim 1, wherein
the first generation unit is configured to generate the first correction data in response to a generation instruction by an operator, and
the image forming apparatus further comprises:
a notification unit configured to execute a notification action to urge issuance of the generation instruction in response to a determination made by the second determination unit that the first correction data is to be generated.

3. The image forming apparatus according to claim 1, further comprising:
a second storage unit configured to store the second correction data generated by the second generation unit; and
a second correction unit configured to correct the formation density by the forming unit based on the second correction data stored by the second storage unit.

4. The image forming apparatus according to claim 3, wherein
the second correction unit is configured to perform a gamma correction.

5. The image forming apparatus according to claim 1, further comprising:
a reading unit configured to read an image,
wherein the first generation unit is configured to determine the density in each of the plurality of regions based on image data obtained by reading the first image formed by the forming unit by the reading unit.

6. The image forming apparatus according to claim 1, further comprising:
a reading unit configured to read an image,
wherein the second generation unit is configured to determine the density based on image data obtained by reading the second image formed by the forming unit by the reading unit.

7. The image forming apparatus according to claim 1, wherein
the second image is formed by the forming unit based on image data predetermined as representing an image in which a plurality of patches of a same color and a same gradation value are arranged along a dividing direction of the plurality of regions, and
the first determination unit is configured to determine an amount of unevenness as a difference in density determined by the second generation unit respectively for a plurality of patches formed by the forming unit so as to be a plurality of patches of the same color and the same gradation value along the dividing direction of the plurality of regions.

8. The image forming apparatus according to claim 1, wherein
the forming unit includes a plurality of element image forming units that form element images of different colors,
the first generation unit is configured to generate correction data for correcting density unevenness for each of the plurality of regions divided in the main scanning direction of element images respectively formed by the plurality of element image forming units for each of the plurality of element image forming units,
the first storage unit is configured to store a plurality of correction data generated by the first generation unit, respectively, and
the first correction unit is configured to correct a density of each of the element images formed by the element image forming unit for each of the plurality of regions based on a plurality of correction data stored by the second storage unit.

9. The image forming apparatus according to claim 8, wherein
the second image is formed by the forming unit based on image data predetermined as representing an image in which a plurality of patches of a same gradation value for each of formation colors of the plurality of element image forming units are arranged along the dividing direction of the plurality of regions, and
the first determination unit is configured to determine an amount of unevenness for each color as a difference in density determined by the second generation unit respectively for a plurality of patches formed by the forming unit so as to be a plurality of patches of the same gradation value for each of the formation colors of the plurality of element image forming units.

10. The image forming apparatus according to claim 9, wherein
if the amount of unevenness determined for any one color by the first determination unit is larger than a predetermined reference, the second determination unit is configured to determine that the first correction data is to be generated by the first generation unit.

11. An image forming method, comprising:
   generating first correction data for correcting a density of an image to be formed for each of a plurality of regions in order to compensate for unevenness of a formation density in each of the plurality of regions, based on a density in each of the plurality of regions divided in a main scanning direction for a predetermined first image formed;
   storing the first correction data generated;
   correcting the density of the image to be formed for each of the plurality of regions based on the first correction data stored by a first correction unit;
   generating second correction data for correcting the formation density separately from the correction by the first correction unit, based on a density of a predetermined second image formed;
   a first determination unit configured to determining an amount of unevenness in the main scanning direction of the formation density based on the density of the predetermined second image formed; and
   a second determination unit configured to determining that the first correction data is to be generated by a first generation unit, based on the amount of unevenness determined.

12. The image forming method according to claim 11, further comprising:
   generating the first correction data in response to a generation instruction by an operator by the first generation unit; and
   executing a notification action to urge issuance of the generation instruction in response to a determination made that the first correction data is to be generated.

13. The image forming method according to claim 11, further comprising:
   storing the second correction data generated; and
   correcting the formation density based on the second correction data stored.

14. The image forming method according to claim 13, further comprising:
   performing a gamma correction.

15. The image forming method according to claim 11, further comprising:
   reading a first image; and
   determining the density in each of the plurality of regions based on image data obtained by reading the first image.

16. The image forming method according to claim 11, further comprising:
   reading a second image,
   determining the density based on image data obtained by reading the second image formed.

17. The image forming method according to claim 11, further comprising:
   forming the second image based on image data predetermined as representing an image in which a plurality of patches of a same color and a same gradation value are arranged along a dividing direction of the plurality of regions; and
   determining an amount of unevenness as a difference in density determined respectively for a plurality of patches formed so as to be a plurality of patches of the same color and the same gradation value along the dividing direction of the plurality of regions.

18. The image forming method according to claim 11, further comprising:
   forming element images of different colors by a plurality of element image forming units;
   generating correction data for correcting density unevenness for each of the plurality of regions divided in the main scanning direction of element images respectively formed by the plurality of element image forming units for each of the plurality of element image forming units;
   storing a plurality of correction data generated, respectively; and
   correcting a density of each of the element images formed for each of the plurality of regions based on a plurality of correction data stored.

19. The image forming method according to claim 18, further comprising:
   forming the second image based on image data predetermined as representing an image in which a plurality of patches of a same gradation value for each of formation colors of the plurality of element image forming units are arranged along the dividing direction of the plurality of regions; and
   determining an amount of unevenness for each color as a difference in density determined respectively for a plurality of patches formed so as to be a plurality of patches of the same gradation value for each of the formation colors of the plurality of element image forming units.

20. The image forming method according to claim 19, further comprising:
   if the amount of unevenness determined for any one color is larger than a predetermined reference, determining that the first correction data is to be generated.

* * * * *